A. HANNAFORD.
SCRAPER OR BEATER ARM FOR ANIMAL SCRAPING OR DEHAIRING MACHINES.
APPLICATION FILED JULY 15, 1907.
1,001,640.
Patented Aug. 29, 1911.
3 SHEETS—SHEET 2.
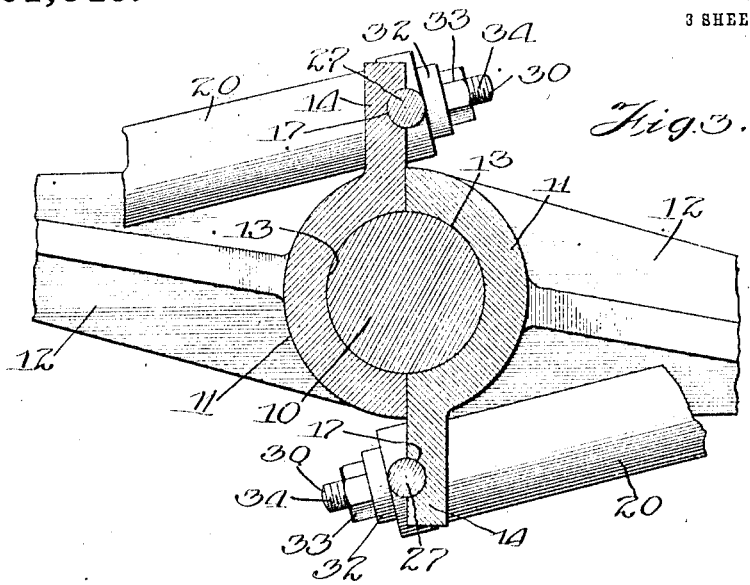
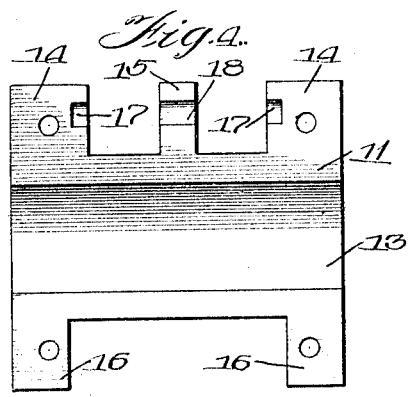
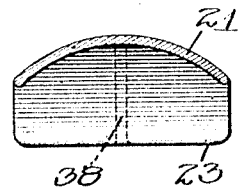
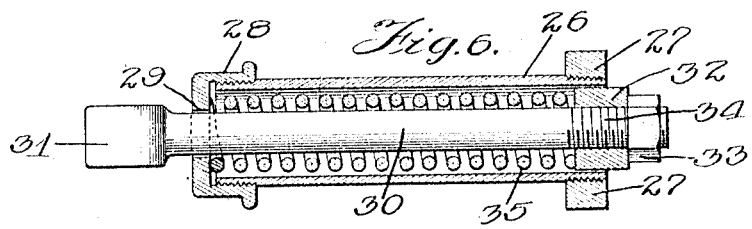
Witnesses:
Inventor:
Alfred Hannaford
by Brown & Hopkins
Attorneys

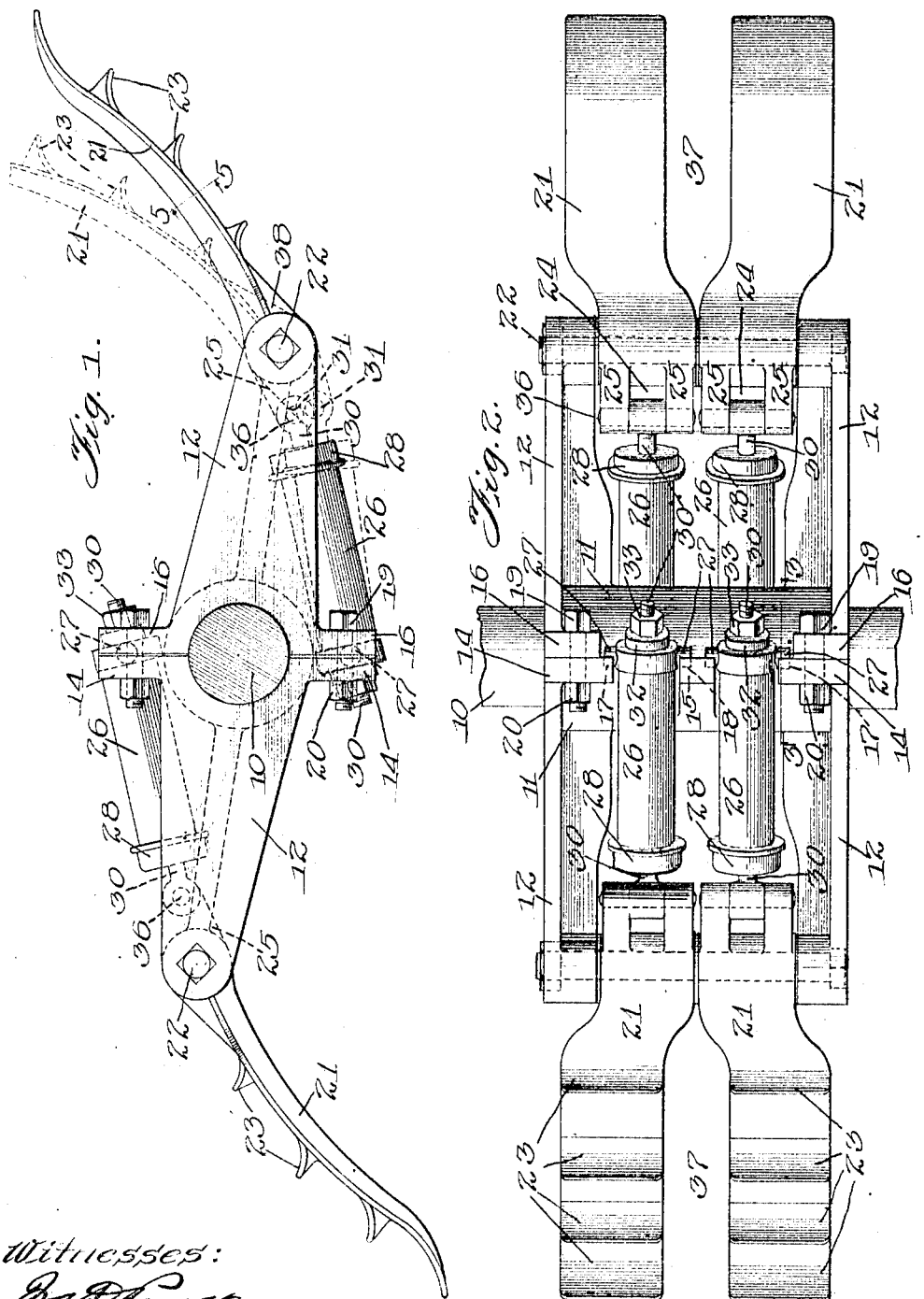

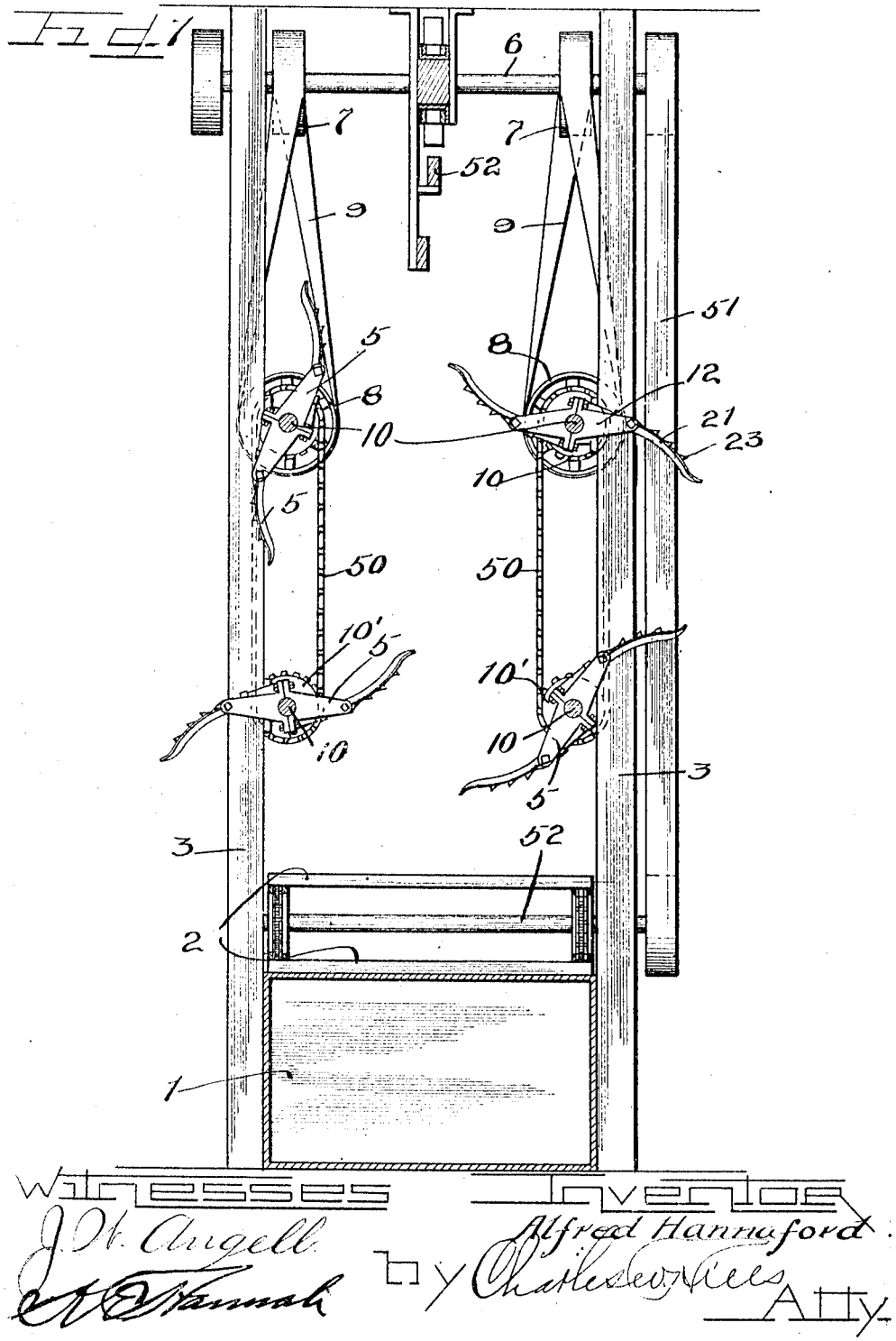

UNITED STATES PATENT OFFICE.

ALFRED HANNAFORD, OF CHICAGO, ILLINOIS, ASSIGNOR TO ALLBRIGHT-NELL COMPANY, A CORPORATION OF ILLINOIS.

SCRAPER OR BEATER ARM FOR ANIMAL SCRAPING OR DEHAIRING MACHINES.

1,001,640. Specification of Letters Patent. Patented Aug. 29, 1911.

Application filed July 15, 1907. Serial No. 383,835.

*To all whom it may concern:*

Be it known that I, ALFRED HANNAFORD, a citizen of the United States, residing at Chicago, in the county of Cook and State of Illinois, have invented certain new and useful Improvements in Scraper or Beater Arms for Animal Scraping or Dehairing Machines, of which the following is a specification.

This invention relates to improvements in scraper or beater arms particularly adapted for use in hog scraping or dehairing machines, and the primary object of the invention is to construct an improved elastic arm of this character whereby the hair will be scraped from the carcass during its passage through the machine without injuring the flesh.

A further object is to construct an improved elastic arm of this character, and improved means for centralizing or returning the arm to its normal position after it has passed out of engagement with the carcass to properly position the same to be again brought into contact with the carcass.

A further object is to provide an improved pivotally mounted arm of this character and improved yielding means for permitting the arm to assume a proper position according to the size of the carcass and for automatically centralizing or returning the arm to its normal position.

A further object is to provide an improved flexibly mounted scraper arm and improved means for varying the tension of the arm.

A further object is to provide an improved flexibly mounted rotary scraper arm.

A further object is to provide an improved device of this character which will be simple, durable and cheap in construction and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawings illustrating an exemplification of the invention, and in which—

Figure 1 is a side elevation of an improved device of this character constructed in accordance with the principles of this invention. Fig. 2 is a top plan view of Fig. 1. Fig. 3 is an enlarged detail sectional view on line 3—3 of Fig. 2. Fig. 4 is a rear elevation of one of the supporting brackets or members. Fig. 5 is a detail sectional view on line 5—5 of Fig. 1. Fig. 6 is an enlarged detail view, partly in section, of one of the compensators for the arms. Fig. 7 is a vertical section of a scraping machine illustrating the operation of the scrapers.

1 indicates a tank and 2, a suitable conveyer movable over the top thereof. Secured on suitable upright or frame members 3—3 are a plurality of shafts, 10, on which the beaters and scrapers indicated as a whole by 5, are secured to rotate therewith. A transverse drive shaft 6, is suitably journaled to the frame members 3—3 on which and the upper beater shafts pulleys 7 and 8, are secured around which belts 9—9 are trained to drive the upper beater shafts.

Sprocket wheels 10', are secured to the beater shafts 4, and a chain 50, is trained around all the sprocket wheels on the same side of the machine, thereby simultaneously actuating all the beater shafts. A belt 51, is trained around pulleys on the drive shaft 6, and the conveyer shaft 52, for actuating the conveyer 2. A suitable track 52, is supported above and between the beater shafts on which the carcasses are supported to pass between the beaters Secured to said beater shafts are a plurality of radially projecting brackets or members 11 arranged diametrically opposite each other and each of said members comprises spaced side arms 12. The body portion 11 of the brackets is provided with a semi-circular recessed portion 13 in the rear face thereof, which is adapted to receive a portion of the shaft 10 and each of the members or brackets 11 is provided with projecting ears or lugs 14, 15 extending beyond one edge thereof and substantially at right angles to the arms 12. Arranged on the other side of the body portion 11 are spaced ears 16.

The lugs or projecting ears 14 are preferably spaced from each other for some distance and are provided with recesses 17 in the rear faces thereof and in the adjacent edges. The lug or projecting ear 15 is preferably located at a point midway between the lugs or projecting ears 14 and is provided with a recessed or cut away portion 18 in the rear face thereof, which extends entirely across said lug or projecting ear and in such a position as to register with the recesses 17 in the lugs or projecting ears 14. The brackets or members 11 are placed on opposite sides of the shaft 10 so that the semi-circular portions 13 will receive the shaft and the body portions 11 of the brackets or members will surround the shaft. These brackets or members are secured for rotation with the shaft in any desired or suitable manner, preferably by means of bolts or screws 19 which pass through registering apertures in the ears or projections 16 and the respective lugs or projecting ears 14 and said bolt or screw 19 is held from displacement in any desired or suitable manner, preferably by means of a nut 20 engaging the threaded extremity thereof preferably beyond the lugs or projecting ears. The bolts 19 and nuts 20 tend to draw the body portions 11 of the brackets or members tightly against the shaft 10 so that when the shaft is rotated the brackets or members will rotate therewith. The lugs or projections 16 are preferably of a width less than the width of the lugs or projecting ears 14 so that when the brackets or members are secured in position, the lugs or projections 16 will terminate short of the recesses 17 in the lugs or projecting ears 14.

Pivotally supported between the side arms 12 are the beater arms 21, which are pivoted preferably at a point adjacent one extremity thereof by means of a suitable bolt or axle 22, which preferably passes through a suitable bearing in the arms and also through the extremities of the side arms 12 and may be held against displacement in any desired or suitable manner. Any number of these pivotally supported arms 21 may be arranged between the respective pairs of side arms 12, two being shown in the present exemplification of the invention. Each of the arms 21 is preferably curved and of the configuration shown more clearly in Fig. 1 of the drawings and extending from one of the faces thereof and on one side of the pivot and beyond the extremity of the side arms 12 are a plurality of ribs or scraper blades 23. The other extremity of the arms is preferably bifurcated, as at 24, to form spaced ears 25.

A suitable tubular member or cylinder 26 is provided adjacent one extremity with laterally extending lugs or projections 27, the said extremity of the cylinder being preferably open while the other extremity thereof is preferably closed by means of a cap 28 having a suitable aperture 29 passing therethrough.

Arranged within the tubular member or cylinder 26 is a bolt or rod 30, one extremity of which passes through the aperture 29 and is provided with a transverse aperture 31 in the head thereof. Secured to the other extremity of the bolt 30 is an adjustable collar 32 which may be held in position by means of a suitable nut 33 engaging the threaded extremity 34 of the bolt. The collar 32 is of a diameter somewhat smaller than the internal diameter of the tubular member or cylinder 26 and is adapted to move freely into the cylinder.

Arranged within the cylinder is a yielding member 35 preferably in the form of a coil spring which surrounds the bolt 30 with one extremity thereof resting against the cap 28, and the other extremity against the collar 32, so that when the collar 32 is moved into the cylinder by drawing upon the projecting extremity of the bolt 30 the yielding member or spring 35 will be placed under tension, which latter may be varied by adjusting the collar 32 and the nut 33.

The extremity of the bolt 30 having the transverse aperture 31 therein is of a size to stand within the bifurcation 24 in the extremity of the pivotally supported arm 21 and is secured to said arm by means of a pin or bolt 36 which passes through suitable apertures in the ears 25 which register with the aperture 31 in the bolt 30. When the extremity of the bolt 30 is secured to the bifurcated extremity of the pivotally supported arm 21 the free extremity of the cylinder or tubular member 26 is adapted to stand between the lug or projecting ear 15 and the respective lug or projecting ear 14, so that the lugs or projections 27 thereon will enter and be pivotally seated within the respective recess 17 and the recess 18, whereby the cylinder or tubular member 26 will be pivotally supported. When in this position if the arm 21 is moved about its point of pivotal support into the dotted position, as shown in Fig. 1 of the drawings, the collar 32 will be drawn into the tubular member or cylinder 26, thereby creating a tension upon the yielding member 35, and the cylinder or tubular member 26 will be moved about its point of pivotal support to permit the arm 21 to assume such a position. These arms 21 are preferably arranged in pairs disposed diametrically opposite to each other and having their faces carrying the ribs or scrapers 23 opposed to each other so that when the shaft 10 is rotated, the ribs or scraper blades 23 will be brought into contact with the carcass to scrape the same as it passes through the machine; and when the respective arms strike the carcass they will be moved about their points of pivotal support in the manner already described to permit the arms to pass the carcass without injuring the same or lacerating the flesh, and after the arms have passed out of engagement with the carcass they will be centralized or returned to their normal position by means of the expansion of the yielding member or spring 35.

In the present exemplification of the invention, two arms 21 are arranged adjacent each other and the adjacent edges are so shaped as to form an intervening space 37 to permit the arms to pass on each side of the legs of the carcass, and also to permit the arms to be independently yielding so as to contact with the entire surface of the carcass during its passage through the machine.

The arms 21 may be of any desired size and configuration but are preferably convex, as shown more clearly in Fig. 5 of the drawings, and may be provided with a suitable reinforcing rib 38 disposed preferably adjacent the points of pivotal support for strengthening the arms and for protecting the bearing.

It will thus be seen that with this improved construction the scraper or beater arms will be automatically returned to their normal position and that the arms themselves and the means for returning the arms to their normal position are so mounted with relation to each other and to the support as to permit the arms to automatically accommodate themselves to the varying sizes of the carcasses.

In order that the invention might be fully understood by those skilled in the art, the details of the foregoing embodiment thereof have been thus specifically described, but

What I claim as new and desire to secure by Letters Patent is:

1. A hog scraper comprising a rotatable shaft, a support clamped thereto, scrapers pivoted to the support provided with scraping blades, cylinders pivoted at their inner ends on the support and spring pressed rods in the cylinders each pivotally connected with one of the scrapers.

2. In a device of the class described a rotatable shaft, a support rigidly secured therto, metallic beaters pivoted intermediate their ends to the support, and a spring operated rod connected to the support to oscillate and pivotally connected with one end of the beaters adapted to yieldingly hold the beaters in normal position.

3. In a device of the class described a rotatable shaft, a support secured thereto, beaters pivoted to the support intermediate their ends, blades secured to the beaters, rods pivoted to the inner ends of the beaters, springs on the rods exerting a yielding pressure on the rods and holding the beaters in operative position and cylinders pivoted on the supports to oscillate and inclosing the rods and springs.

4. A hog scraper comprising a rotatable shaft, a support secured thereto, oscillating cylinders secured to the support, scrapers pivoted to the supports and tension mechanism oscillatable with the oscillatable cylinders and pivotally connected with the scrapers.

5. A beater comprising a rotatable shaft, a support thereon, cylinders provided with gudgeons at one end which are journaled to the support, beaters pivoted to the supports, rods pivoted to oscillate and having pivotal connection with the beaters and extending into the cylinders, and a spring on each rod in the cylinder.

6. In combination, a rotatable support, means for rotating the support, a scraper member pivotally mounted intermediate the ends on the support, a tension device including yieldingly connected elements, one of said elements being pivotally connected to the support and the other being pivotally connected to the adjacent end of the scraper member for returning said member to its normal position with relation to the support.

7. In combination, a rotatable support, means for rotating the support, a scraper member pivotally mounted intermediate its ends on the support, a tension device, comprising a tubular member having an apertured cap on one end, a rod passing through the aperture in said cap and provided with an enlargement movable in the tubular member, one of the elements of the tension device being pivotally connected to one end of the scraper member and the other element being pivotally connected to the support, and an elastic member disposed within the tubular member and between the closed end thereof and the enlargement on the rod.

8. In combination, a rotatable support, means for rotating the support, a scraper member pivotally mounted intermediate its ends on the support, an oscillating tension device comprising a tubular member having an apertured cap on one end, a rod passing through the aperture in said cap and provided with an enlargement movable in the tubular member, one of the elements of the tension device being pivotally connected to one end of the scraper member and the other element being pivotally connected to the support, a yielding member within the tubular member between the closed end thereof and the enlargement of the rod and means for varying the tension of the said yielding member.

9. In combination, a rotatable support, means for rotating the support, provided with open bearings, an arm pivotally mounted intermediate its ends on the support remote from the bearings, said arm being provided with scraping blades, a tension device comprising a cylinder having a closed end, a rod, one extremity of which passes through the closed end, said rod being provided with an enlargement movable within the cylinder, means for pivotally connecting the extremity of the rod to the adjacent end of the arm, said cylinder being provided with lateral projections adapted to be removably seated in the bearings, an elastic member within the cylinder between the end thereof and the enlargement on the rod and means for rotating the support.

10. In combination, a rotatable support, provided with open bearings, an arm pivotally mounted intermediate its ends on the support remote from the bearings, said arm being provided with scraping blades, a tension device comprising a cylinder having a closed end, a rod, one extremity of which passes through the closed end, said rod being provided with an enlargement movable within the cylinder, means for pivotally connecting the extremity of the rod to the adjacent end of the arm, said cylinder being provided with lateral projections adapted to be removably seated in the bearings, an elastic member within the cylinder between the end thereof and the enlargement on the rod, adjustable means for varying the tension of the elastic member, and means for rotating the support.

11. In combination, a rotatable shaft, supports secured for rotation with the shaft and extending on opposite sides thereof, an elastic arm mounted on each of the supports, said arms being provided with scraping blades on the opposed faces thereof, oscillating cylinders pivoted at their ends on the supports and spring pressed rods in the cylinders each pivotally connected with one of the arms for creating a tension on said arms.

12. In combination, a rotatable shaft, oppositely disposed supports, means for removably securing the supports to the shaft for rotation therewith, an elastic arm secured to each of the supports, each of said arms being provided with scraping blades on one face thereof oscillating cylinders pivoted at their ends on the supports and spring pressed rods in the cylinders, each pivotally connected with one of the arms.

13. In combination a rotatable shaft, oppositely disposed supports, means for removably securing the supports to the shaft for rotation therewith, an arm mounted intermediate its ends on each of the supports, a separate tension device for each of said arms, said tension devices comprising telescoping elements, one of said elements being pivotally connected to one end of the respective arm, means for detachably and pivotally connecting the other element to the support, and an expansion member disposed between the said elements adapted to yieldingly hold the same in normal position.

14. In combination, a rotatable shaft, oppositely disposed supports, means for removably securing the supports to the shaft for rotation therewith, an arm pivotally mounted intermediate its ends on each of the supports, a separate oscillating tension device for each of said arms, said tension devices comprising telescoping elements one of said elements being pivotally connected to one end of the respective arm, means for detachably and pivotally connecting the other element to the support, a spring member disposed between the said elements and means for adjusting the tension of the spring member.

In testimony whereof I have signed my name to this specification, in the presence of two subscribing witnesses, on this 11th day of July A. D. 1907.

ALFRED HANNAFORD.

Witnesses:
J. H. JOCHUM, Jr.,
M. W. CANTWELL.